Inventor
Vojtěch Puc
By his Attorneys

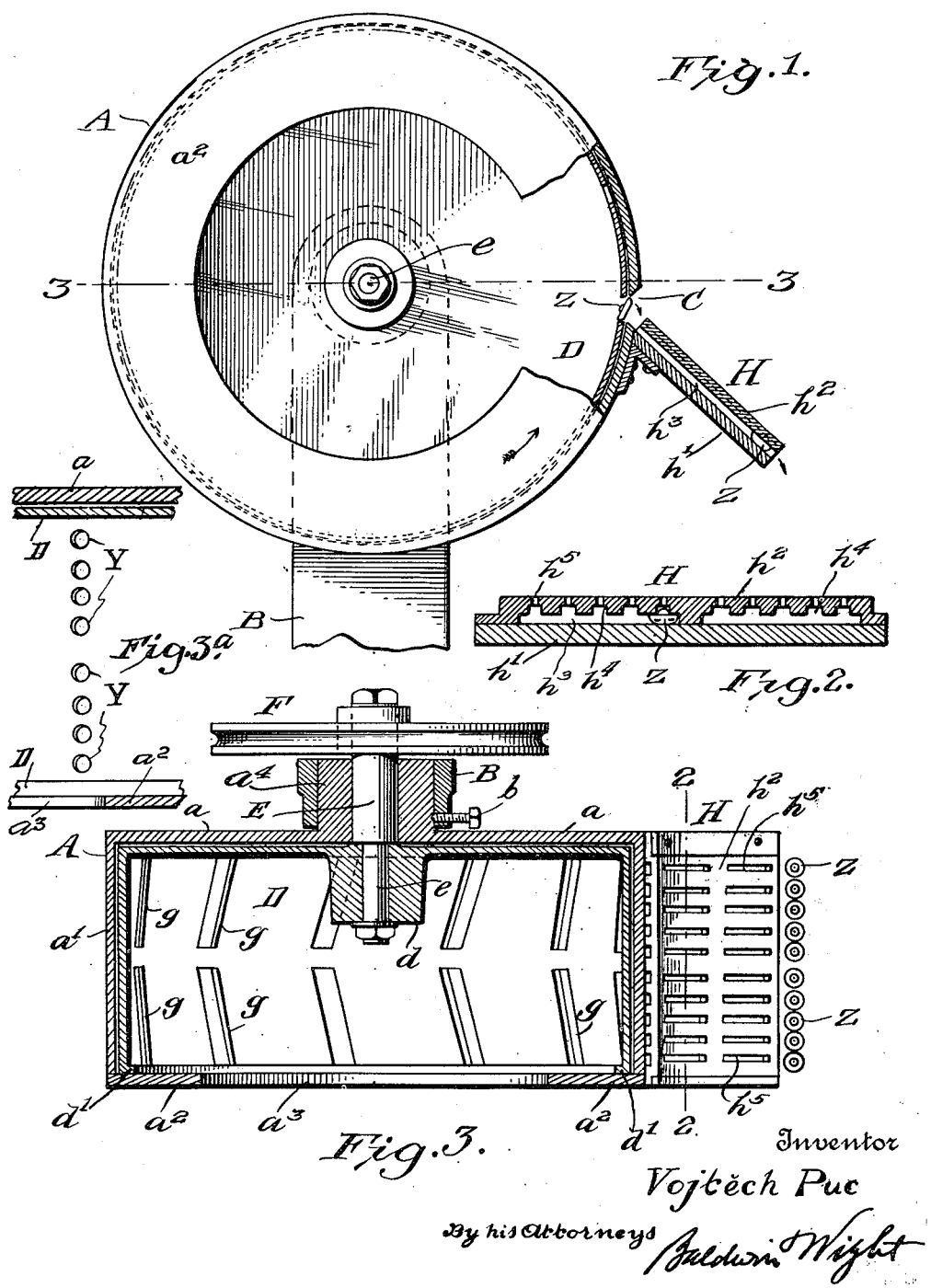

Patented June 5, 1923.

1,457,459

UNITED STATES PATENT OFFICE.

VOJTĚCH PUC, OF PRAGUE-VINOHRADY, BOHEMIA.

FEED MECHANISM FOR SMALL METAL ARTICLES.

Application filed February 6, 1920. Serial No. 356,782.

(GRANTED UNDER THE PROVISIONS OF THE ACT OF MARCH 3, 1921, 41 STAT. L., 1313.)

*To all whom it may concern:*

Be it known that I, VOJTĚCH PUC, a citizen of the Republic of Czechoslovakia, residing at Prague-Vinohrady, in Bohemia, have invented certain new and useful Improvements in Feed Mechanism for Small Metal Articles (for which I have filed application in Austria Oct. 10, 1913, patent granted Dec. 23, 1915, No. 71,447; in Germany, application filed Apr. 23, 1921, patent granted July 21, 1922, No. 356,271, and in Czechoslovakia, application filed Oct. 10, 1913, patent granted Feb. 24, 1922, No. 8176), of which the following is a specification.
This invention relates to apparatus for automatically conveying small metal articles in regular order from a container in which they are held in an irregular mass to apparatus in which they are operated upon to further treat or use them.

In carrying out my invention, I provide a cylinder, drum or casing which is supported on a suitable frame and held stationary thereon and within this casing I arrange a drum which is mounted to turn slowly about a horizontal axis. The outer drum or casing is completely closed at its rear end and at its opposite end it is partially closed by a circular plate extending for some distance inward from the periphery of the drum towards the center thereof but leaving a clear, unobstructed opening at the center. The outer drum or casing is formed with a horizontally arranged slot or opening in a plane slightly below a line passing horizontally through the axis of the drum. Through this slot small metal parts or articles pass to guide channels, in the manner hereinafter described. The inner drum is adapted to receive the articles in an irregular mass and this inner drum is formed with transversely arranged slots or recesses which receive the articles and hold them until they are conveyed to the slot in the outer drum or casing where they are delivered. As the articles fall out of the slot in the outer drum they pass onto an inclined guide or chute provided with channels through which the articles descend in regular order and from the bottom of which they are delivered but in regular order to a suitable conveyer which carries them to another machine, forming no part of the invention herein claimed. Means may be provided for agitating the guide or chute to prevent jamming of the articles and to insure regular feed thereof, and in some cases the channels in the guide or chute are made of unequal lengths and deliver to a horizontally inclined table over which the articles pass to the point of delivery.

In the accompanying drawings:

Figure 1 is a view partly in front elevation and partly in section of so much of a machine embodying my invention as is necessary to illustrate my improvements.

Figure 2 is a view on an enlarged scale and in section on the line 2—2 of Fig. 3 of the channeled guide or chute for guiding the articles from the drums to a point of delivery.

Figure 3 shows a horizontal section on the line 3—3 of Fig. 1.

Figure 3ª is a fragmentary view showing a modification.

Figure 4:
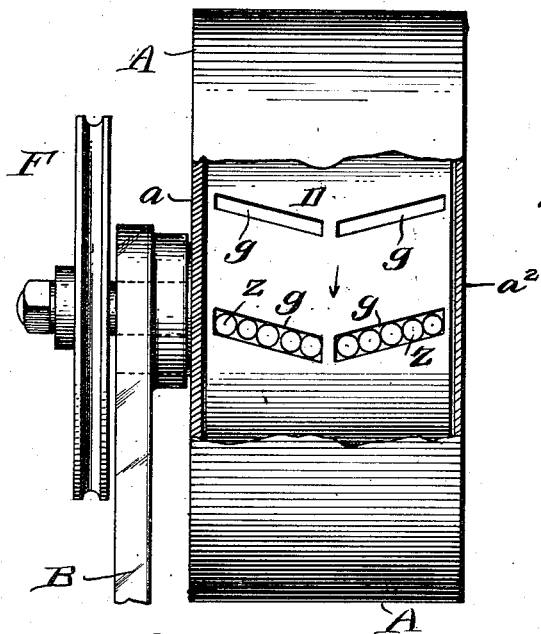

Figure 4 is a view of the machine, partly in side elevation and with parts of the casing broken away to show the construction of the inner drum.

Figure 5:
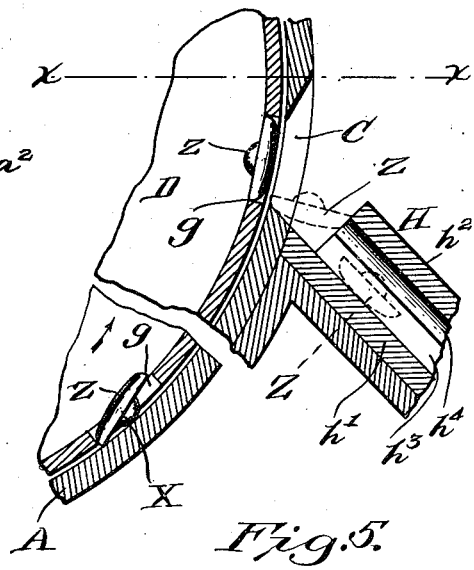

Figure 5 is a detailed view on an enlarged scale and in section, showing particularly how the articles are carried to the delivery slot or opening in the casing and how they are discharged into the channels of the inclined guide or chute.

Figure 6:
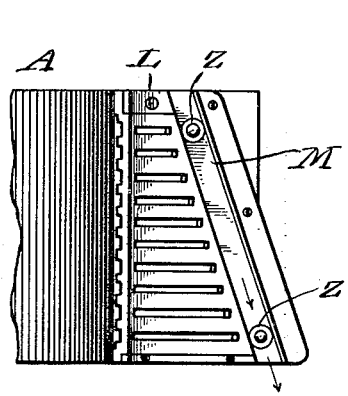

Figure 6 is a detail plan view showing a modified form of guide or chute.

Figure 7:
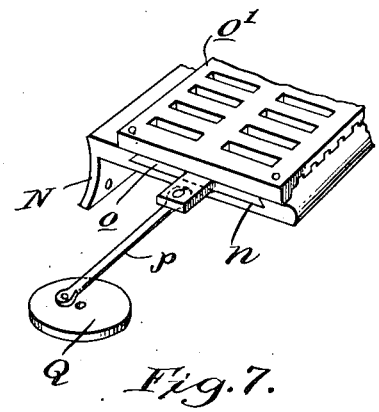

Figure 7 is a perspective view, largely diagrammatic, illustrating mechanism for vibrating the guide or chute.

Figure 8:
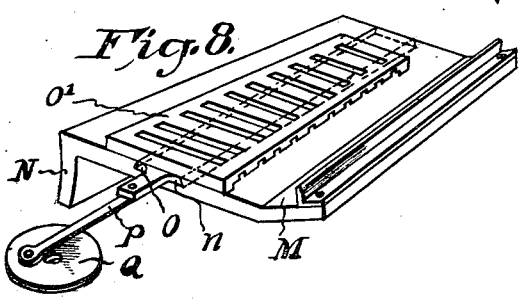

Figure 8 is a view similar to Figure 7 showing the means for vibrating the modified guide of Figure 6.

A horizontally arranged drum or casing A is supported on a frame B of any suitable construction. The drum is closed at its rear end $a$ and on its periphery $a^1$ and the front is partially closed by an annular plate $a^2$ which extends inwards from the periphery of the drum towards the center thereof but leaves a clear space $a^3$ through which articles are introduced. At its rear end the drum is formed with a boss $a^4$ which is secured to the frame B by a set screw $b$ in such manner that the drum may be turned about its axis and held in its adjusted position.

On one side the drum or casing is formed with a delivery slot C, the edges of the casing on opposite sides of the slot being bevelled or inclined, as shown particularly in Fig. 5. The slot C extends entirely across the drum and is arranged a short distance below a plane indicated by a line $x, x$ which passes through the axis of the drum. The exact position of the slot may be regulated by turning the drum about its axis and holding it in position on the frame by the set crew $b$.

Within the drum or casing A is mounted a drum D which revolves slowly within the casing. This drum is closed at the rear where it is formed with a boss $d$ which is secured to a spindle $e$, forming part of a short shaft E mounted to revolve in the boss $a^4$ and carrying a drive pulley F. The front of the drum is for the most part open but the periphery of the drum is provided with a short inwardly projecting flange $d^1$.

In the periphery of the drum are formed slots $g$ which are adapted to receive the articles so that they may be carried around with the drum. Preferably these slots are arranged in pairs and are inclined towards each other as shown, there being a space between the inner ends of each pair of slots. The slots serve to position the articles and also to advance them. By means of the angular arrangement of the slots, the articles will be positioned in unbroken rows and properly distributed as they are fed.

The drum revolves in the direction indicated by the arrow (Figs. 1 and 5) and as the slots $g$ come opposite the slot C in the casing, the articles fall out from the inner drum and pass through the slot in the casing in the manner indicated in Fig. 5. Should any of the articles be improperly arranged in the slots, as indicated at X in Fig. 5, they will fall back into the drum. The articles will not be carried to the upper position shown in Figs. 1 and 5 opposite the slot C unless the bases of the articles lie in the slots.

It will be observed that a plurality of articles are carried in the slots of the inner drum to the delivery slot of the casing. The articles at the inner ends of the inclined slots are in the same radial plane and are delivered simultaneously through the slot C; immediately after this the two adjoining articles which are also in the same radial plane, pass out through the slot. In this way confusion is avoided and yet the delivery of the articles in pairs in this way increases the output of the mechanism. I would say, however, that so far as some features of my invention are concerned, instead of employing slots inclined in the manner explained, I may use recesses arranged in the manner indicated at Y in Fig 3ª, although this arrangement is not preferred.

As the inner drum revolves the articles fall out of the slots $g$ and are received by guides presently to be described.

The articles are indicated in the several figures of the drawings by the letter Z.

As the articles pass out through the slot C they fall on to a guide or chute H provided with guide channels. The guide or chute comprises a bottom plate $h^1$ and a top plate $h^2$ which is held on to the bottom plate and spaced therefrom in such a manner as to provide a passage $h^3$ for the wider portions of the articles and it is formed with channels $h^4$ for the socket or cap portions of the articles so that articles are held in rows as they pass through the channels with all socket portions uppermost. The guide or chute is inclined downwards from the slot C of the outer casing and the articles pass from the lower end of the guide or chute and may be received by a guide of a suitable kind through which they pass to another machine. Slots $h^5$ are formed in the upper plate $h^2$ to enable the attendant to insert a suitable tool to loosen the articles should they become jammed.

In Fig. 6, I have shown a modification in which the guide or chute L is somewhat changed in form. In this case the channels are of unequal length and they deliver to an inclined channel M, through which the articles pass to a point of delivery.

This arrangement is employed when it is desired to feed the articles in a single row to the apparatus where they are subsequently treated notwithstanding the fact that they issue simultaneously in pairs through the slot C in the casing.

It may be desirable to agitate the articles while passing through the guide channels and any suitable means may be employed for this purpose. In Fig. 7, I have shown means for giving a vibratory movement to the guide or chute. As there shown the bracket or frame N which is secured to the casing A is formed with a recess $n$ which receives the lower member $o$ of the guide or chute, the upper member is indicated at $o^1$. The guide or chute is connected by a rod P to an eccentric Q which may be operated by any suitable mechanism. In this way the guide or chute may be vibrated or shaken slightly so as to loosen the articles or prevent them from jamming.

In Figure 8 is disclosed means for vibrating the modified guide shown in Figure 6. The lower part $o$ of the guide is made as narrow as the narrowest part of the guide, while the upper member $o^1$ of the guide tapers from one end towards the other.

Experience has demonstrated that a machine constructed and operated in the manner above described is most efficient in operation. The articles may be fed from time to time as needed through the opening $a^3$ in the outer casing. They collect on the bottom of the inner drum and are prevented from falling therefrom by the annular plate $a^2$. If the articles enter the slots $g$ improperly they are returned to the drum but those articles which properly enter the slots are carried to the discharge opening of the casing and when they reach the elevation or level, indicated in Fig. 5, they fall over sidewise, in the manner indicated by dotted lines in Fig. 5, and pass into the channels which guide them to their destination.

I have shown as a specific example my improvements embodied in a machine for feeding snap fasteners or press buttons but they may be embodied in machines for feeding various small metal parts or articles and they have been successfully used for such purposes. While I have specified metal parts or articles it will of course be understood that the material of which the parts or articles are made is not essential.

I claim as my invention:

1. A machine for feeding small metal articles, comprising a drum or casing having a delivery opening in its periphery, an inner drum having transversely arranged openings in its periphery to receive the articles, means for revolving the inner drum to carry the articles upwards to the delivery opening of the casing, and guide channels through which the articles pass from said delivery opening.

2. A machine for feeding small metal articles, comprising a drum or casing having a delivery opening in its periphery, an inner drum the axis of which is above the horizontal plane passing through the delivery opening in the casing and which is provided with transversely arranged openings in its periphery to receive the articles, means for revolving the inner drum to carry the articles upwards to the delivery opening of the casing, and guide channels through which the articles pass from said delivery opening.

3. A machine for feeding small metal articles, comprising a drum or casing having a delivery opening in its periphery, an inner drum provided with slots extending inwardly from opposite sides of the frame towards each other to receive the articles, means for revolving the inner drum to carry the articles upwards to the delivery opening of the casing, and guide channels through which the articles pass from the delivery opening.

4. A machine for feeding small metal articles, comprising a drum or casing having a delivery opening in its periphery, an inner drum having slots to receive the articles inclined inwardly from the opposite sides of the drum towards each other and inclined inwardly in the direction in which the drum rotates, means for revolving the inner drum to carry the articles upwards to the delivery opening of the casing, and guide channels through which the articles pass from said delivery opening.

5. A machine for feeding small metal articles, comprising a drum or casing having an opening to receive a supply of the articles, and an opening in its periphery for the delivery of the articles, and which is mounted to turn about its horizontal axis to regulate the position vertically of said delivery opening, an inner drum having transversely arranged openings within it, means for revolving said inner drum to carry the articles upwards to the delivery opening of the casing, and guide channels through which the articles pass from said delivery opening.

6. A machine for feeding small metal articles, comprising a frame or casing having a delivery opening in its periphery, an inner frame having transversely arranged openings in its periphery to receive the articles, means for revolving the inner drum to carry the articles upwards to the delivery opening in the casing, and an inclined delivery chute provided with channels through which the articles pass from the delivery opening of the casing to their points of delivery.

7. A machine for feeding small metal articles, comprising a drum or casing having a delivery opening in its periphery, an inner drum having transversely arranged openings in its periphery to receive the articles, means for revolving the inner drum to carry the articles upwards to the delivery opening of the casing, an inclined delivery chute provided with channels through which the articles pass from the delivery opening of the casing, and means for agitating or shaking the articles while passing through said channels.

8. A machine for feeding small metal articles, comprising a drum or casing having a delivery opening in its periphery, an inner drum having transversely arranged openings in its periphery to receive the articles, means for revolving the inner drum to carry the articles upwards to the delivery opening of the casing, and an inclined delivery chute provided with channels of unequal lengths through which the articles pass.

9. A machine for feeding small metal articles, comprising a drum or casing having a delivery opening in its periphery, an inner drum having transversely arranged openings in its periphery to receive the articles, means for revolving the drum to carry the articles upwards to the delivery opening in the casing, a chute having channels of unequal length through which the articles pass from the delivery opening of the casing, and an inclined channel for receiving the articles from said first mentioned channels and which delivers the articles at their destination.

10. A machine for feeding small metal articles, comprising a cylindrical drum or casing mounted to turn about a horizontal axis and having a delivery opening in its periphery an inner drum mounted to revolve within the casing about a horizontal axis coincident with the axis of the casing, said inner drum having a series of pairs of slots formed in its periphery which are inclined inwardly towards the central, vertical plane of the drum towards each other and which are adapted to receive the articles to be fed, means for revolving the inner drum to carry the articles upwards to the delivery opening of the casing, and channels through which the articles pass from said delivery opening.

In testimony whereof, I have hereunto subscribed my name.

VOJTĚCH PUC.